Figure 1:
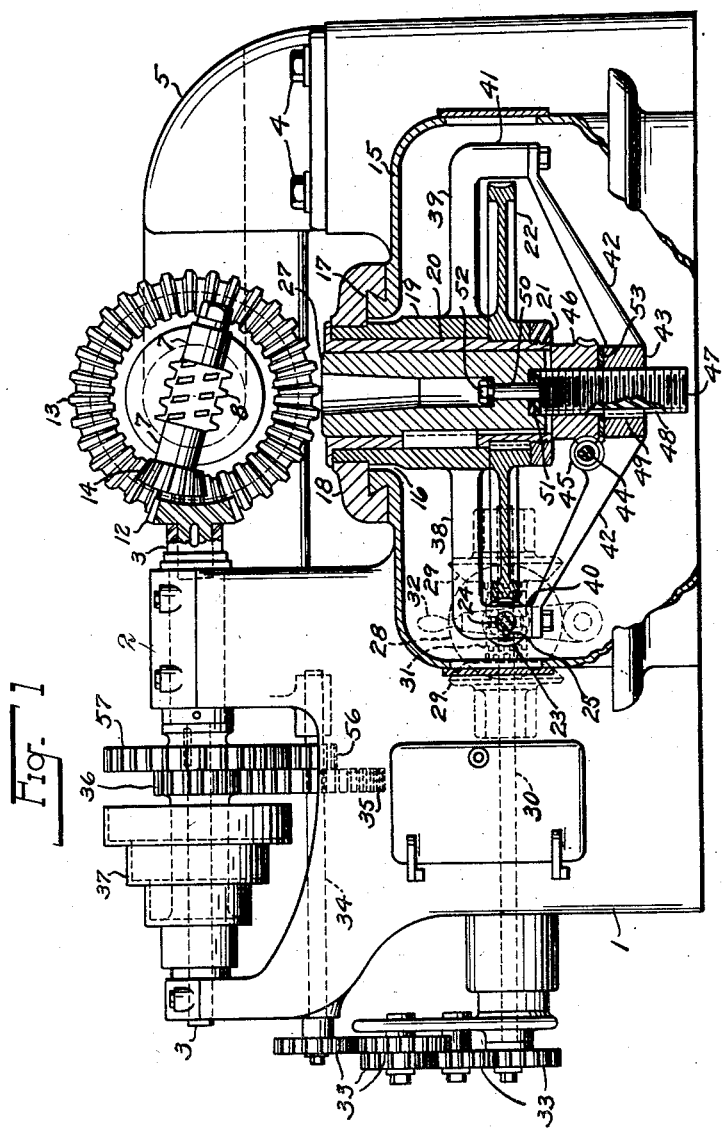

E. J. LEES.
PROCESS FOR CUTTING HELICAL GEAR WHEELS.
APPLICATION FILED JAN. 29, 1913.

1,082,533.

Patented Dec. 30, 1913.

3 SHEETS—SHEET 1.

WITNESSES

INVENTOR
Ernest J. Lees.
BY
ATT'Y.

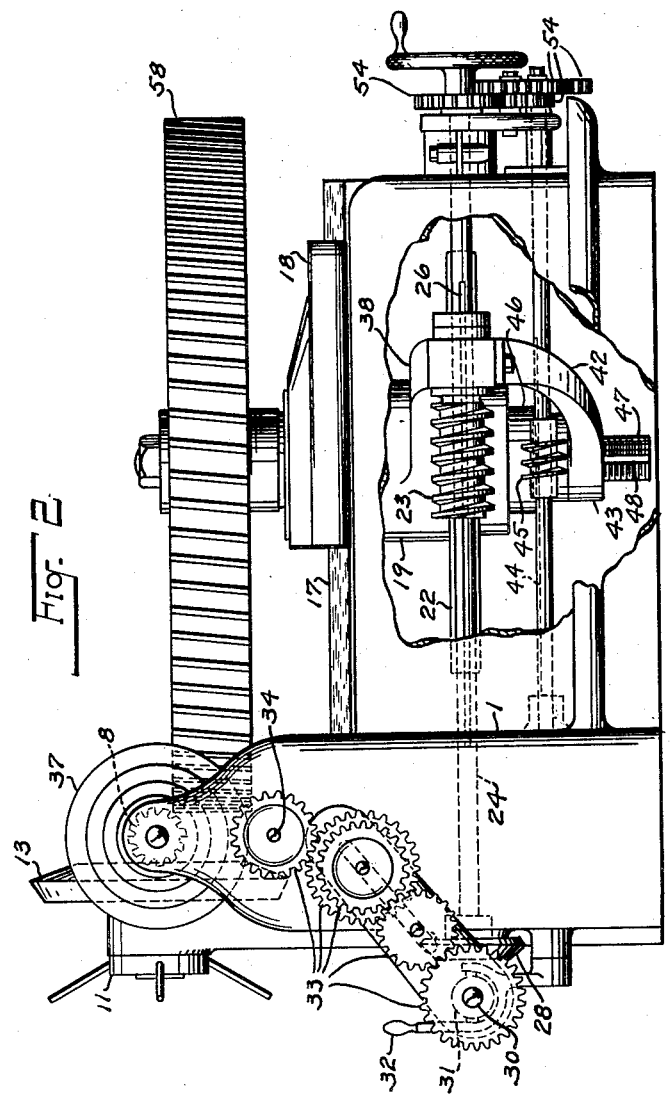

E. J. LEES.
PROCESS FOR CUTTING HELICAL GEAR WHEELS.
APPLICATION FILED JAN. 29, 1913.
1,082,533.
Patented Dec. 30, 1913.
3 SHEETS—SHEET 3.
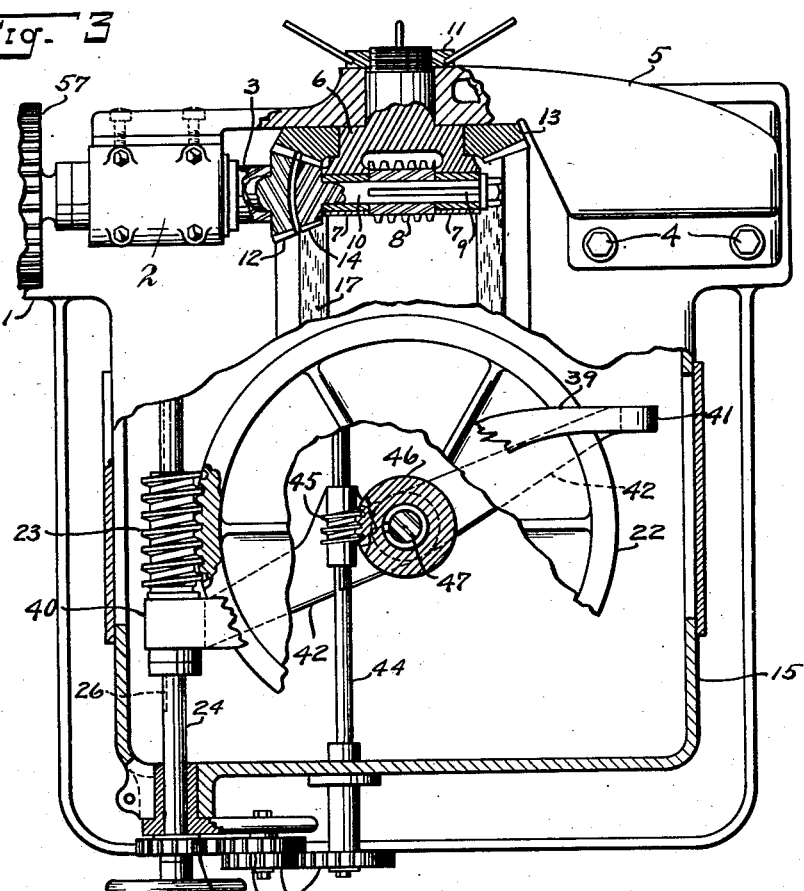
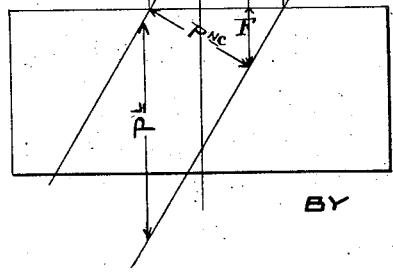
WITNESSES
INVENTOR
Ernest J. Lees.
BY
ATTY.

UNITED STATES PATENT OFFICE.

ERNEST J. LEES, OF CLEVELAND, OHIO, ASSIGNOR TO GOULD & EBERHARDT, OF NEWARK, NEW JERSEY, A CORPORATION OF NEW JERSEY.

PROCESS FOR CUTTING HELICAL GEAR-WHEELS.

1,082,533.

Specification of Letters Patent.   Patented Dec. 30, 1913.

Application filed January 29, 1913. Serial No. 744,810.

*To all whom it may concern:*

Be it known that I, ERNEST J. LEES, a citizen of the United States, and a resident of Cleveland, in the county of Cuyahoga, State of Ohio, have invented certain new and useful Improvements in Processes for Cutting Helical Gear-Wheels, and do hereby declare the following specification, taken in connection with the drawings forming a part of same, to be a full, clear, concise, and exact description of the invention and the best mode contemplated to apply said principle, so as to distinguish it from other inventions and to enable any person skilled in the art to which it appertains or with which it is most nearly connected to make, construct, and use the same.

This invention relates primarily to a method of generating the teeth of helical gear wheels by means of a helical or hob cutter.

The subject matter of this invention is a continuation in part of a co-pending application, Serial No. 471,596, filed January 11th, 1909 by the applicant.

This invention relates more particularly to a method of generating the teeth of helical gear wheels by a helical or hob cutter without imparting a differential motion to either the blank to be cut or the cutter therefor.

The primary object of this invention is to provide an arrangement adapted to produce a correlation of the rate of feed and the relative rates of rotation of the gear blank and helical or hob cutter so that the advance of the blank and cutter relative to each other is in a direction substantially parallel to the axis of the gear blank, and the lead of a helical cutter, when properly correlated will produce helical or spiral teeth on the gear blank without incorporating a differential device or its equivalent.

The annexed drawings and the following description set forth in detail certain contrivances embodying means constituting however, but one of the various mechanical forms in which the principle of the invention may be used.

The novelty of the invention will be readily understood from the drawings which show a construction for practising the invention in its preferred form, and from the following description thereof, and is more particularly pointed out and distinctly claimed in the claims annexed to said description.

In the drawings:—Figure 1 is a front elevation of a machine partly in section, for practising this invention. Fig. 2 is an end elevation. Fig. 3 is a plan view partly in section. Fig. 4 is a diagrammatic view of a helical gear illustrating the component elements thereof, used in connection with this invention.

Upon one side of the frame 1 of the machine is provided a head-stock 2, in which is mounted a live-spindle 3. Upon the other side of the frame is secured in suitable T slots, by means of bolts 4, a cross-member 5, which extends transversely of the machine and is bolted to the rear of the head-stock 2. Upon the cross-member 5 is carried a swiveling arbor support 6 provided with double bearings 7, between which is placed a hob 8, fastened by a suitable spline and key 9 to the arbor 10, journaled in the bearings 7. The swiveling arbor support 6 may be locked in position by the nut 11 upon its outer end, which extends through the cross-member 5.

Upon the end of the live-spindle 3 is secured a bevel pinion 12 which meshes with a bevel idler 13, which rotates on, around and concentric with the swiveling arbor support 6. This bevel idler 13 has a face wide enough to mesh with another bevel pinion 14 by the side of the bevel pinion 12, said pinion 14 being secured to the end of the hob arbor 10. The pinion 14 is enough closer to the center of the swiveling arbor support 6 than the pinion 12, to allow said pinion 14 to swing by the live-spindle pinion 12 without interference. The idler gear 13 is always free to rotate since it is journaled in a space upon the swiveling arbor support 6, which is wider than the length of the hub of the gear 13.

The frame 1 is provided with a bed plate 15, within which is an opening 16, extending lengthwise of the machine, and at the sides of this opening are the dovetailed ways 17, on which is mounted the carriage 18, adapted to slide toward and from the live-spindle 3. Rigidly secured to the carriage 18 is a cylindrical barrel 19, which extends downwardly within the carriage. Within the barrel 19 is rigidly mounted a sleeve 20 upon the lower end of which is fitted a nut 21, and to the sleeve 20 is keyed a worm wheel 22, between said nut 21 and cylindrical barrel 19. The worm wheel 22, meshes with the worm sleeve 23, slidably secured to the shaft 24 by means of a key 25, carried upon the sleeve 23 and the groove 26 in the shaft 24. The sleeve 23 is thus rendered longitudinally movable of the shaft 24. Rotatively secured to, but movable longitudinally of the sleeve 20, is a vertically movable spindle 27 adapted to support the work blank and feed the latter upwardly so that the teeth may be cut therein as hereinafter more fully explained. The shaft 24 is connected with the live-spindle 3 by suitable mechanism which will compel the worm wheel 22, the sleeve 20 and the spindle 27 to rotate once while the live-spindle 3 is rotating as many times as there are teeth to be cut in the spur gear. The specific mechanism for effecting this connection includes a bevel gear 28 secured to a shaft 24 and engaging with the bevel gears 29 which are loosely mounted to rotate upon the transverse shaft 30 and are alternately connected to said shaft 30 by means of a clutch 31, operated by a handle 32, so as to rotate said shaft 24 in either direction when so desired. Change gears 33 connect said shaft 30 with the shaft 34, which shaft 34 receives its motion through the gears 35 and 36. The latter gear 36 is secured to and rotatable with the cone pulley 37.

An arm 38 secured to, or integral with the barrel 19 of the carriage 18, engages in a circumferential groove in the worm sleeve 23, whereby as the said carriage is moved, the worm sleeve will also be moved upon the shaft 24 to maintain its proper relation with the worm wheel 22. The adjustment of the carriage 18 is effected by any well known means, such as a screw and handwheel as shown in the co-pending application.

Projecting downward from the arms 38 and 39, which may be secured to, or integral with the barrel 19, are two pads 40 and 41 to which are secured the respective ends of the transverse member 42 which has a centrally located bearing 43 concentric with the spindle 27. The arm 38 embraces a shaft 24, but is longitudinally movable thereon. The transverse member 42 has suitable bearings for a spline shaft 44 and a worm 45 secured thereto. This worm 45 meshes with a worm wheel 46 which is internally threaded and fits upon a vertical screw 47 which passes freely through the transverse member 42 vertically, but is not allowed to rotate, having a spline 48 which runs the whole length of the threaded portion of the screw 47 and is engaged by a fixed key 49 in the central bearing 43. The vertical screw 47 has upon its upper end a reduced portion 50 which passes through a small bore in the spindle 27, there being provided a thrust collar 51 at the lower end and a nut and collar 52 at the upper end. The upper collar is spaced at such a distance from the spindle 27 as to allow the latter to rotate freely. The bearing 43, on the transverse member 42, is so located that there is just the necessary clearance between this upper face and the lower face of the sleeve 20, to allow the worm wheel 22 and the thrust collar 53 to fit in between and rotate. The spline shaft 44 is geared to the shaft 24 by suitable change gears 54 that can be adjusted to feed the spindle 27 vertically at any desired ratio to the rotation of said spindle 27. It will accordingly be seen that means are provided, specifically change gears 54 whereby the rate of feed of the blank across the hob may be varied as desired. At the same time it will be recalled that means are provided, specifically change gears 33, whereby the relative rates of rotation of the hob and blank may be determined as desired. These means being all inter-connected it will then be apparent that by suitable adjustment of the change gears 54 and the change speed gears 33, the feed movement of the blank and the lead of the hob, which the latter must be given in the cutting of helical or spiral gears, may be properly correlated. That this statement may be clearly comprehended, I will advert briefly to the operation involved in cutting first an ordinary spur gear with my improved mechanism above described, and then in cutting a helical or spiral gear.

If an ordinary spur gear, that is, one having straight teeth is to be cut, the hob, which may have teeth of any desired shape and pitch, is secured in the head at such an angle to the plane of the wheel to be cut, as will compensate for the helical line on which the teeth of the hob lie. The change speed gears 33 are then engaged so as to effect as many revolutions of the hob to one revolution of the blank, as there are teeth to be cut in the latter. Upon the blank being now fed upwardly on a line parallel with its axis across the face of the hob, the teeth across the whole width of the blank face will be cut in a direction parallel with the axis of the blank as is required for spur wheels. In thus cutting spur wheels the rate of feed of the blank thus across the hob, is adjusted to give the best results, having in view the character of the material constituting the blank and without any regard to the relation of such feed to the relative rotative movement of the blank and hob. If now, however, it is desired to cut helical or spiral teeth upon the blank while the feed of the blank is in the same direction and the rate of such feed is determined by the same consideration as before, the relative rates of rotation of the blank and hob are carefully correlated with such feed movement by proper adjustment of the change gears 33 and 54. This for the reason that to cut spiral teeth, the hob requires to be secured in the head at an angle to the plane of the blank, greater or less as the case may be, than the angle of the pitch, by an amount equal to the angle of the teeth to be cut. The hob will accordingly in its rotations, have to be given an effective lead, either positive or negative, the amount of which lead for each fraction of the rotation will have to correspond, having due regard to the angle of the gear to be cut, to the advance of the blank across the hob during the same time. The calculation of the gear connections involved to determine the ratio of change gears 33 and 54 in order to secure this correlation of rate of feed and relative rates of rotation so that the advance of the blank and lead of the hob may be thus correlated for the cutting of any particular gear, is rendered relatively simple by the use of suitable tables which will now be taken up in detail, and for convenience reference is had to the following notations and formulæ.

$P^{NC}$ = normal circular pitch of helical gear to be cut or the shortest distance between any two consecutive teeth and is measured on the normal to the helices and determines the size of the cutter to be used.

$P^{ND}$ = normal diametral pitch of the helical gear and cutter.

$P^C$ = circular pitch and is measured at right angles to the axis of the gear.

$P^L$ = linear pitch measured parallel to the axis of the gear.

N = number of teeth in the gear.
D = pitch diameter of the gear.
D° = outside diameter of the gear.
a = addendum.
X = angle of the helices with the axis of the gear.
L = lead of the helices or the advance in one turn.

The following formulæ are ordinarily used to determine the various parts of a helical gear when the usual known quantities are given, to wit: $P^{NC}$, N and X:

$$P^{NC} = \frac{\pi}{P^{ND}}; \quad P^C = \frac{P^{NC}}{\cos X}; \quad P^L = \frac{P^{NC}}{\sin X}$$

$$D = \frac{N}{P^{ND} \cos X} = \frac{N P^{NC}}{\pi \cos X}; \quad D° = D + 2a$$

$$a = \frac{P^{NC}}{\pi} = \frac{1}{P^{ND}}$$

$$L = \frac{N P^{NC}}{\sin X} = \frac{N P^C}{\tan X} = \frac{N \pi}{P^{ND} \sin X}$$

In cutting a helical gear upon any automatic helical gear cutting machine with a helical cutter, it is always necessary to rotate the blank in unison with the helical cutter at a speed depending upon the number of teeth to be cut, while at the same time, the cutter is advanced across the face of the blank in what results in a helical path upon the peripheral face of the blank, passing around the axis of the blank, such path being due in other machines to differential gears inserted in the cutter drive or indexing mechanism. This invention produces a helical path by imparting rotary motion to the blank and cutter in accordance with the number of teeth to be cut plus or minus a fractional part of a tooth, which fractional tooth is dependent upon the linear pitch of the gear to be cut and the feed desired. The feeding motion is parallel to the axis of the gear blank and can be relative to either the rotations of the cutter or the gear blank. In this invention the feed is preferably arranged relative to the rotations of the gear blank, and the formulæ hereinafter derived are particularly adapted thereto.

To cut a helical gear the usual elements known are the number of teeth N, the normal circular pitch $P^{NC}$, and the angle of the teeth X with the axis of the blank. From the known quantities the circular pitch $P^C$, which is relative to the number of teeth, may readily be found by the formula $$P^C = \frac{P^{NC}}{\cos X}$$

Then since it is known that for every rotation of the blank the cutter advances a certain increment which must be proportional to the rotation, number of teeth, and circular pitch of the gear blank to properly form the helix, we can take a fractional part of the circular pitch as the base of a right angled triangle and the vertical feed as the side of the same. Then the angle formed by the side and the hypotenuse of the triangle would equal the angle X to be cut on the gear. Then letting $\frac{1}{T}$ equal the fractional part of the tooth and F the vertical feed, we have:

$$\cot X = \frac{F}{\frac{P^{NC}}{\cos X}} \cdot \frac{1}{T} = \frac{FT \cos X}{P^{NC}}$$

$$T = \frac{P^{NC}}{F \sin X} = \frac{P^L}{F}$$

To select the change gears at 33 to establish the proper rate of rotation between the cutter and work blank, the fractional part of a tooth T as found above is added to or subtracted from the number of teeth N to be cut in the blank. The fraction tooth is subtracted when using the same hand helical cutter as the gear to be cut and it is added when the helical cutter is of the opposite hand to the gear. The formula for the change gears at 33 would then be as follows:

Letting K equal the ratio of the constant gearing between the gear blank and cutter. Then the change gears 33 for cutting a spur gear would be $\frac{K}{N}$, and for a helical gear it would be in accordance with the above reasoning:

$$\frac{K}{N \pm \frac{1}{T}} = \frac{KT}{NT \pm 1} \text{ formula I}$$

The formula for the feed gears at 54 would be derived by multiplying the actual feed F by a constant K', which equals K'F and in which K' is a constant determined from the relative ratios of the constant gearing between the work blank and feed screw. This formula is expressed and used in terms of the fractional tooth T and is derived as follows:

$$\text{Since } T = \frac{P^{NC}}{F \sin. X} = \frac{P^L}{F}$$

$$\text{Then } F = \frac{P^{NC}}{T \sin. X} = \frac{P^L}{T}$$

Substituting the value F in K'F we obtain $$K'F = \frac{K'P^L}{T} = \frac{K'P^{NC}}{T \sin. X} \text{ formula II}$$

To obtain a proof formula whereby it may be ascertained whether the gears selected according to formula II will be within the limits of accuracy desired, it is only necessary to divide the formula II by the gearing ratio used, thus letting R equal the ratio of change gears used, then $$\frac{K'P^{NC}}{T \sin. X} \div R = \frac{K'P^{NC}}{RT \sin. X} = 1$$

The digit 1 resulting from the proof formula expresses the extra rotation required for the lead of the helical gear, and usually is only approximately one.

The operation of the machine is as follows: The cone pulley 37 receives its motion from any suitable source of power, and rotates freely on the main spindle 3. The cutter is rotated from the cone pulley through the gear 36 secured to the pulley and gear 35. The latter is secured to the gear 56 and rotates the gear 57 keyed to the main spindle 3. Bevel gears 12, 13 and 14 transmit rotation from the main spindle 3 to the cutter 8. The work blank 58 which is secured to the spindle 27 is rotated from the cone pulley 37 through the gears 36 and 35, the latter being secured to the shaft 34, and the index change gears 33, which connect the shafts 34 and 30. The bevel gears 29, either of which can be clutched to the shaft 30, engage with and rotate the bevel gear 28 which rotates the worm 23. Motion is then transmitted to the work spindle 27 through the worm wheel 22 meshing with the worm 23. The feeding motion of the blank parallel to its axis is obtained from the index worm shaft 24 by means of the change wheels 54 which connect said shaft 24 to the feed driving shaft 44. A worm 45 rotated by said shaft 44 meshes with the worm 46 which is internally threaded and feeds the screw 47, secured to the work spindle 27, in an upward direction.

Having described my method of cutting helical gear wheels with a helical cutter, I claim as new and desire to secure by Letters Patent:

1. A method of cutting helical gear wheels consisting of rotating a gear blank and helical cutter with relative speeds, through a single, continuous and unvarying motion from a driver to said gear blank and cutter respectively, said relative rotations being determined by the ratio of the number of teeth to be cut to the number of threads in the cutter, plus or minus an increment dependent upon the amount of feed desired for each rotation of the gear blank and imparting a feeding motion substantially parallel to the axis of, and relative to the rotations of the gear blank to produce helical teeth on said blank that have a directrix coinciding with the axis of the gear blank.

2. A method of cutting helical gear wheels, consisting of rotating a gear blank and helical cutter with relative speeds, through a single, continuous and unvarying motion from a driver to said gear blank and cutter respectively, said relative rotations being determined by the ratio of the linear pitch of said gear blank to the lead of said gear, plus or minus the feed desired for each rotation of the gear blank, and imparting a feeding motion substantially parallel to the axis and relative to the rotations of said gear blank to produce helical teeth on said gear that have a directrix coinciding with the axis of said gear blank.

3. A method of cutting the teeth of helical gear wheels, that have a directrix coinciding with the gear blank axis, consisting of rotating a helical cutter, and imparting rotary motion to a gear blank relative to said cutter, through a single, continuous and unvarying motion from a driver to said cutter and gear blank respectively, the relative rotations of the cutter and gear blank being dependent upon the number of teeth to be cut in the gear less a fractional part of a tooth, and of feeding said cutter relative to the rotations and parallel with the axis of said gear blank at a rate dependent upon the linear pitch of the gear blank and said fractional part of a tooth.

4. A method of cutting the teeth of helical gear wheels that have a directrix coinciding with the gear blank axis, consisting of rotating a helical cutter, and imparting rotary motion to a gear blank relative to said cutter, through a single, continuous, and unvarying motion from a driver to said cutter and gear blank respectively, the relative rotations of the cutter and gear blank being dependent upon the number of teeth to be cut in the gear, plus a fractional part of a tooth, and of feeding said cutter relative to the rotations and parallel with the axis of said gear blank at a rate dependent upon the linear pitch of the gear blank and said fractional part of a tooth.

5. The process of cutting the teeth of helical gear wheels, that have a directrix coinciding with the gear blank axis, consisting of rotating a helical cutter, and imparting rotary motion to a gear blank relative to said cutter through a single, continuous and unvarying motion from a driver to said cutter and gear blank respectively, the relative rotations of the cutter and gear blank being dependent upon the number of teeth to be cut in the gear blank, and a constant derived as described, and of feeding said cutter relative to the rotations and parallel with the axis of said gear blank in a ratio dependent upon the linear pitch of the gear blank and said constant.

6. The process of cutting the teeth of helical gear wheels that have a directrix coinciding with the gear blank axis, consisting of imparting a single, continuous and unvarying rotary motion between a helical cutter and gear blank from a driver to said cutter and gear blank, respectively, in a ratio dependent upon the number of teeth to be cut and a fixed constant, and of feeding said cutter and blank relative to each other, parallel to the axis of said blank and relative to the rotations of said single, continuous and unvarying rotary motion in a ratio dependent upon the linear pitch of the gear blank and said fixed constant.

7. The process for cutting the teeth of helical gear wheels that have a directrix coinciding with the gear blank axis, consisting of imparting a single continuous and unvarying rotary motion between a helical cutter and gear blank from a driver to said cutter and gear blank, respectively, in a ratio dependent upon the number of teeth to be cut in the blank, minus the reciprocal of a fixed constant, and of feeding said cutter relative to said single continuous and unvarying rotary motion in a ratio dependent upon the linear pitch of the gear blank divided by said fixed constant.

8. The process for cutting the teeth of helical gear wheels that have a directrix coinciding with the gear blank axis, consisting of rotating a helical cutter, and imparting rotary motion to a gear blank relative to said cutter through a single, continuous and unvarying motion from a driver to said blank and cutter, respectively, said relative rotations being dependent upon the ratio of the intermediate gearing multiplied by a fixed constant and the product divided by the product of the number of teeth to be cut by said constant, minus one, and of feeding said cutter relative to the rotations and parallel to the axis of said gear blank in a ratio dependent upon the ratio of the intermediate gearing multiplied by the normal circular pitch of the gear, and the product divided by said fixed constant multiplied by the sine of the angle of the helical teeth to be produced.

Signed by me this 13th day of January 1913.

ERNEST J. LEES.

Attested by—
CARL R. MUELLER,
WM. F. ZIMMERMANN.